Aug. 5, 1969  G. BOOTHMAN  3,459,323
PHOTOGRAPHIC CAMERA OR THE LIKE WITH
TOGGLE HINGE CLOSURE MEANS
Filed March 15, 1967  2 Sheets-Sheet 2

INVENTOR.
Grover Boothman
BY
Brown and Mikulka
and
Leonard S. Selman
ATTORNEYS

United States Patent Office 3,459,323
Patented Aug. 5, 1969

3,459,323
PHOTOGRAPHIC CAMERA OR THE LIKE WITH TOGGLE HINGE CLOSURE MEANS
Grover Boothman, South Acton, Mass., assignor to Polaroid Corporation, Cambridge, Mass., a corporation of Delaware
Filed Mar. 15, 1967, Ser. No. 623,453
Int. Cl. B65d 43/16
U.S. Cl. 220—35                                6 Claims

ABSTRACT OF THE DISCLOSURE

This application relates to a photographic camera having a body portion, a cover and means for hinging and latching the cover to the body. A particularly useful application of the disclosed concept is the provision on a camera body of a camera back which is hinged at one end and latched to provide a light-tight chamber for exposing the film through the camera lens.

Summary of the invention

The apparatus which is the subject matter of the present invention comprises a cover hinged to the body of a chamber by an integral strip of synthetic resinous material such as polypropylene, provided with parallel areas of reduced thickness to establish reverse fold lines on each side of a toggle portion. Outer portions of the hinge are secured to the cover portion and the chamber body, respectively, to effect the basic hinge action. The cover is provided at its end opposite the hinge with a latching means such as a pin type latch which engages in slots formed in or fixed to the body, said slots opening in a direction away from the hinge. Hence, the cover is closed by aligning the latch pins with the slots in the body and then depressing the hinged end of the cover so that the toggle snaps overcenter to maintain its closed position. To open the cover, the end of the cover adjacent the hinge is snapped upwardly to move the toggle portion back overcenter and release the latch pins from the slots.

In one application of the invention, the cover may constitute a camera back, and the body, a camera body having slots provided thereon to engage pins carried by the camera back.

Accordingly, it is an object of this invention to provide a chamber having a cover and an extremely effective yet simple and inexpensive hinging and latching means for the cover.

Another object of this invention is to provide a camera body having a camera back connected thereto by a hinge member which serves also as part of a latching means for the camera back.

The invention accordingly comprises the apparatus possessing the construction, combination of elements and arrangement of parts which are exemplified in the following detailed disclosure, and the scope of the application of which will be indicated in the claims.

Description of the preferred embodiment

Figure 1:
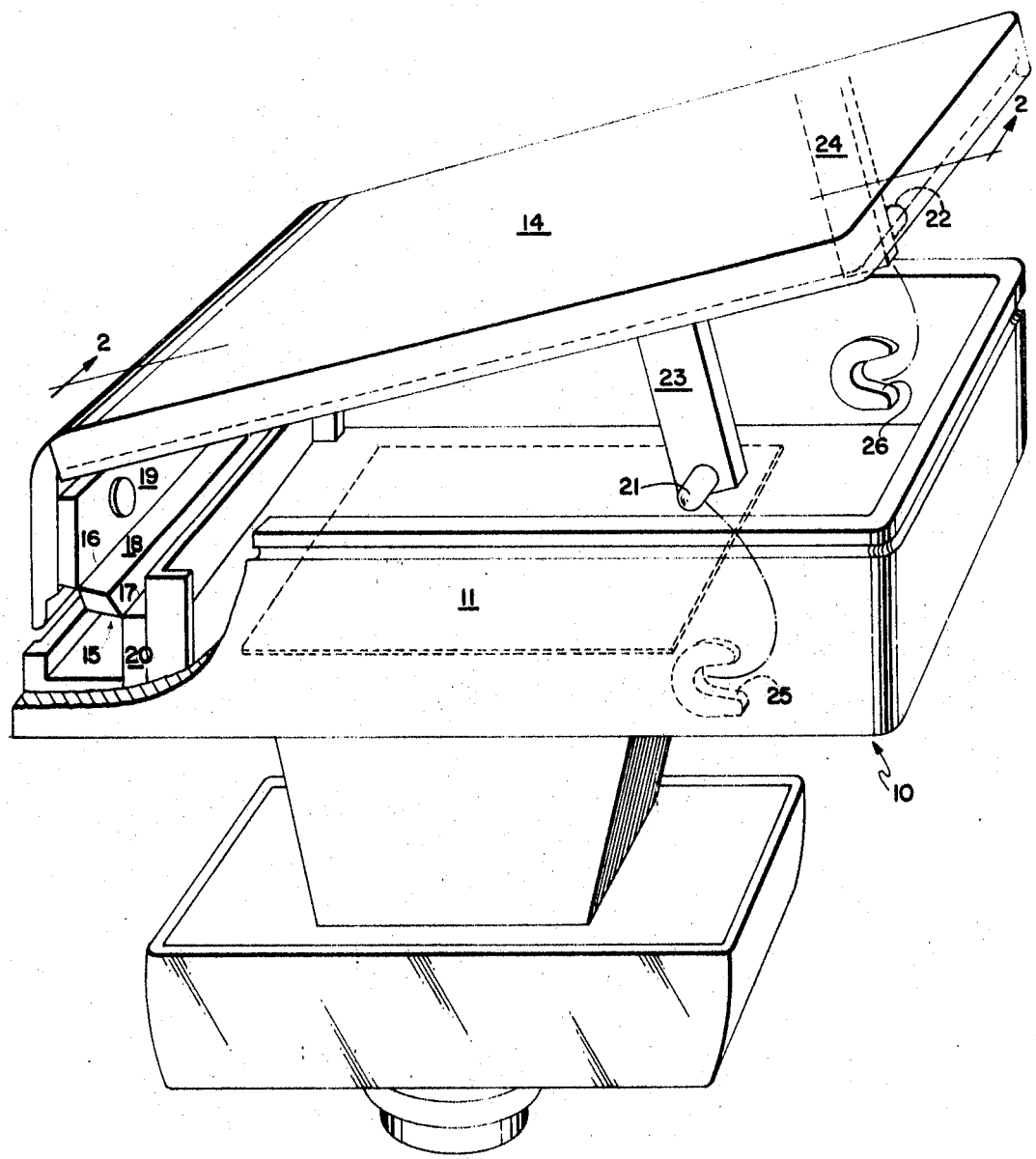
FIGURE 1 is a perspective view of a chamber body and cover therefor constructed according to the present invention.

Referring to FIGURE 1, there is shown a chamber 10 having a body portion 11 and a cover 14 hinged thereto. The body portion and cover may constitute a camera body and back therefor and in such a case the mating parts should be carefully fitted to prevent light leakage. The cover is hinged to the body of chamber 10 by a hinge 15 made of an integral strip of synthetic resinous material such as polypropylene and provide with parallel areas or webs of reduced thickness 16 and 17 which establish reverse fold lines on either side of a toggle or center portion 18. Outer portions of the hinge 19 and 20 are secured to the cover portion and the chamber body respectfully to effect the basic hinge action. The cover is provided at its end opposite the hinge 15 with a latching means such as pins 21 and 22 carried by members 23 and 24. The pins engage in slots 25 and 26, the openings of the slots opening in a direction away from the toggle hinge 15.

Figure 2:
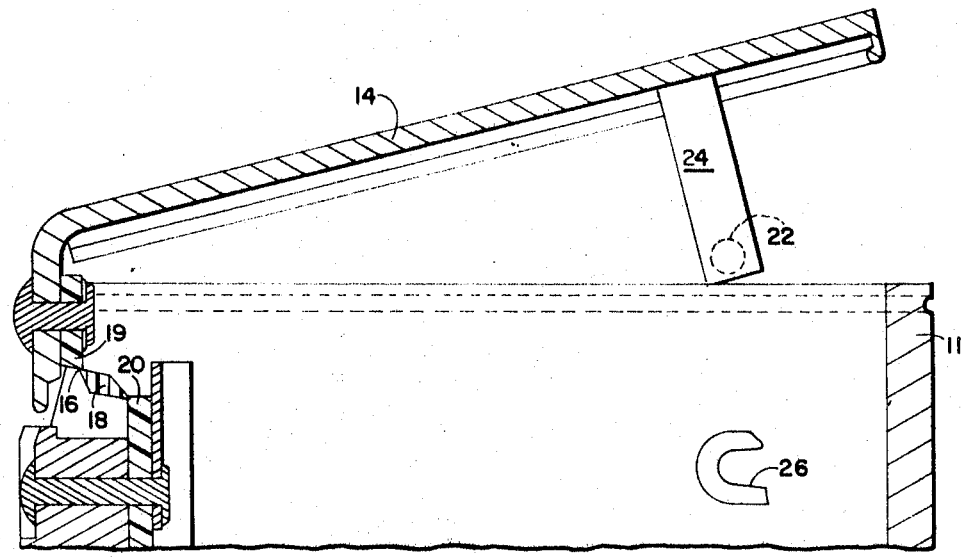
FIG. 2 is a sectional view taken along line 2—2 in FIGURE 1.
Figure 3:
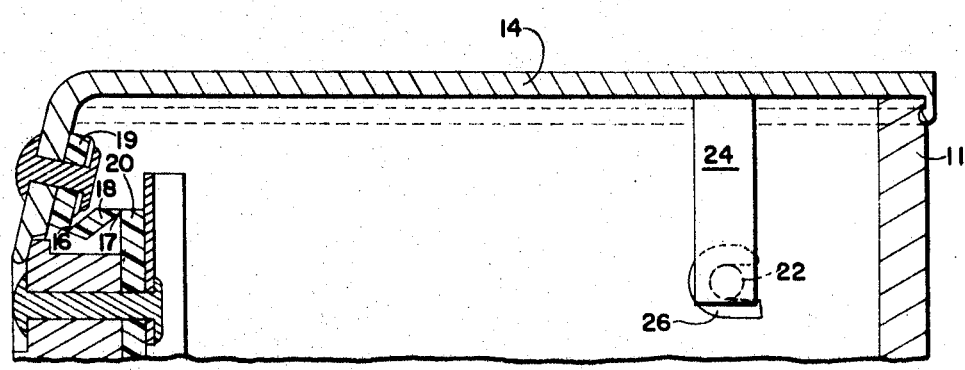
FIG. 3 is a sectional view as shown in FIG. 2 but with the cover in closed position.

The cover 14 is shown in FIG. 2 in cross-section in its open position and in FIG. 3 in its closed position. To open the cover, pressure may be manually applied to the end of the cover adjacent the toggle hinge 15 to force the portion 18 to be angularly displaced until it passes overcenter which allows pins 21 and 22 to slip freely from slots 25 and 26. The cover may be closed, however, by aligning the latch pins 21 and 22 within the slots 25 and 26 and then depressing the hinged end of the cover 14 so that the portion 18 of toggle hinge 15 is again angularly displaced until it again passes overcenter which snaps the cover shut. The term overcenter refers to an imaginary center line which may be visualized as a line extending between and beyond the pivot axis extending through the center of pins 21 and 22 when they are engaged in members 25 and 26, as shown in FIG. 3, and an axis extending along folding web 17 of the hinge 15. Internal forces within hinge 15 will tend to keep the cover 14 shut, as shown in FIG. 3, when portion 18 is angularly displaced to a position on one side of said center line and on the other side of said center line those internal forces will tend to keep the cover open, as shown in FIGURES 1 and 2.

It should be understood that other types of latch means, such as a flange on body portion 11 and a mating overhang on cover portion 14, may be employed in conjunction with hinge 15 for latching the cover to the body.

What is claimed is:
1. A camera body having a light-tight closure means comprising:
   a camera back hinged to said camera body, said body forming a hollow chamber with an opening to the exterior thereof;
   latch means on one portion of said camera back cooperating with an engaging means on said body to lock the back to the body;
   an integral synthetic resinous hinge connecting another portion of said back to the body, said hinge consisting of:
      a plurality of leg portions, wherein a first leg portion is connected to said camera back;
      a second leg portion is connected to said camera body; and
      a third leg portion is pivotally joined to said first and second leg portions by thin, flexible webs, said webs being thinner than the thickness of any of the leg portions, said third leg portion coacting with the camera back so that force on a portion of the back while it is in the open position causes said third leg portion to be angularly displaced until it passes overcenter and forces the latch means on said camera back into locking engagement with the engaging means on said camera body, snapping the camera back shut.

2. The invention of claim 1 wherein the latch means on said one portion of said camera back cooperating with the engaging means on said camera body comprises:
   a pair of latch pins carried by said back, said latch pins engageable with said engaging means on said body to lock the back to the body.

3. The invention of claim 2 wherein the engaging means on said camera body comprises:
   slot means fixed on said body and opening in a direction away from said hinge to receive said latch pins.

4. A chamber having a closure means comprising:
   a cover hinge to a body, said body forming a chamber with an opening to the exterior thereof;
   latch means on one portion of said cover cooperating with an engaging means on said body to lock the cover of the body;
   an integral synthetic resinous hinge connecting another portion of said cover to said body, said hinge consisting of;
      a plurality of leg portions, wherein a first leg portion is connected to said cover;
      a second leg portion is connected to said body; and
      a third leg portion is pivotally joined to said first and second leg portions by thin, flexible webs, said webs being thinner than the thickness of any of the leg portions, said third leg portion coacting with the cover so that force on a portion of the cover while it is in the open position causes said third leg portion to be angularly displaced until it passes overcenter and forces the latch means on said cover into locking engagement with the engaging means on said body, snapping the cover shut.

5. The invention of claim 4 wherein the latch means on said one portion of the cover cooperating with the engaging means on said body comprises:
   a pair of latch pins carried by said cover, said latch pins engageable with said engaging means on said body to lock the cover to the body.

6. The invention of claim 5 wherein the engaging means on said body comprises:
   slot means fixed on said body and opening in a direction away from said hinge to receive said latch pins.

References Cited
UNITED STATES PATENTS

| | | | |
|---|---|---|---|
| 3,167,207 | 1/1965 | Kruger et al. | 220—35 X |
| 3,289,877 | 12/1966 | Wolf | 220—31 |

GEORGE T. HALL, Primary Examiner

U.S. Cl. X.R.
95—11; 220—31